United States Patent [19]
Pai

[11] Patent Number: 4,864,143
[45] Date of Patent: Sep. 5, 1989

[54] TIME-AVERAGE RADON DAUGHTERS (WL) DOSIMETER FOR MINES, INDOOR AND ENVIRONMENT SURVEY

[76] Inventor: Hsiang L. Pai, 50 Silver Star Blvd., Unit 208, Scarborough, Ont., Canada, M1V 3L3

[21] Appl. No.: 274,681

[22] Filed: Nov. 21, 1988

Related U.S. Application Data

[63] Continuation of Ser. No. 849,551, Apr. 8, 1986, abandoned.

[51] Int. Cl.$^4$ ............................................. G01T 1/02
[52] U.S. Cl. .................... 250/472.1; 250/253; 250/482.1; 250/505.1
[58] Field of Search ............... 250/253, 255, 370.02, 250/393, 472.1, 482.1, 505.1, 515.1

[56] References Cited

U.S. PATENT DOCUMENTS

| | | | |
|---|---|---|---|
| 3,558,884 | 1/1971 | Babich et al. | 250/393 |
| 3,922,555 | 11/1975 | Chapuis et al. | 250/472.1 |
| 4,104,523 | 8/1978 | Wolfert | 250/370.02 |
| 4,140,129 | 2/1979 | Heinz et al. | 250/505.1 |
| 4,385,236 | 5/1983 | Hassib et al. | 250/472.1 |
| 4,700,067 | 10/1987 | Carossi et al. | 250/380 |

FOREIGN PATENT DOCUMENTS 2156572 10/1985 United Kingdom ............. 250/472.1

OTHER PUBLICATIONS

J. A. Auxier, Klaus Becker, E. M. Robinson, D. R. Johnson, R. H. Boyett and C. H. Abner, "A New Radon Progeny Personnel Dosimeter", *Health Physics*, vol. 21, (Jul. 1971) pp. 126–128.

*Primary Examiner*—Constantine Hannaher

[57] ABSTRACT

An instrument for selectively detecting alpha particles emitted simultaneously by radium A and radium C' which are derived from radon includes a device for sampling air through a filter which retains the alpha-emitting aerosols, a single detector in which the alpha particles corresponding to the respective energies of the alpha emissions of radium A and of radium C' are selectively detected, and a plurality of collimators placed between the filter and the detector whereby said collimators direct the alpha radiation from the aerosols collected by said filter to said detector. An absorber is disposed between the detector and the collimators. In addition, multiple collimators are provided to achieve improved efficiency of the device. An image analysis system is used to differentiate alpha-emitters of different energies by size.

20 Claims, 3 Drawing Sheets

FIG. 1.
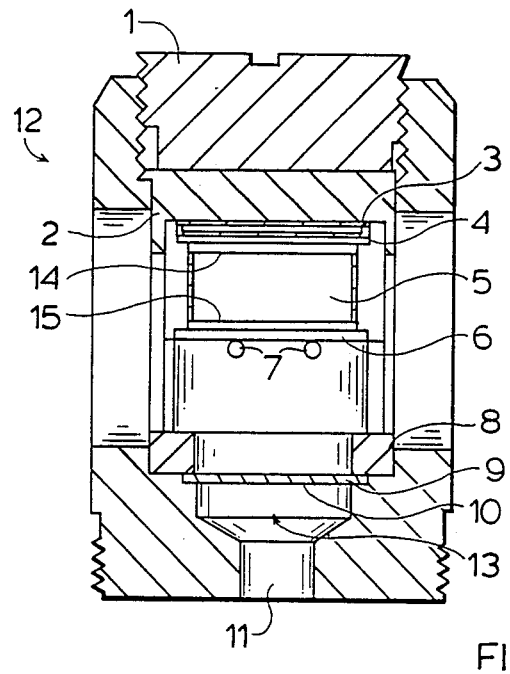
FIG. 1.
FIG. 2a.
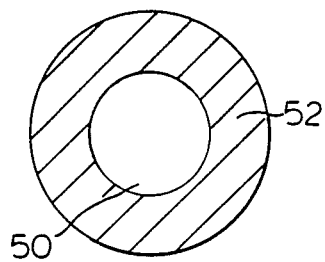
FIG. 2b.
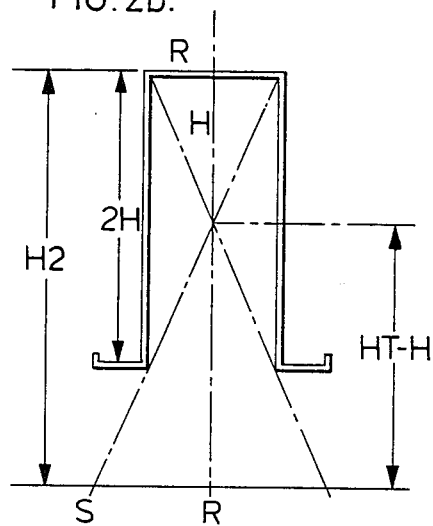
$$SR = \frac{R(HT-H)}{H} = .715$$

$$SR = SA + 2R + D$$
$$= \frac{R(HT-H)}{H} + 2R + D$$
$$= .203 + .226 + .05$$
$$= .48$$

TIME-AVERAGE RADON DAUGHTERS (WL) DOSIMETER FOR MINES, INDOOR AND ENVIRONMENT SURVEY

This is a continuation of application Ser. No. 849,551 filed Apr. 8, 1986 which is now abandoned.

FIELD OF THE INVENTION

This invention relates to a radon daughter working level dosimeter, particularly to a dosimeter that can separately detect Radium A (RaA) and Radium C' (RaC'), wherein Radium A is polonium-218, $E_{alpha}=6$ MeV and Radium c' is polonium-214, $E_{alpha}=7.69$ MeV.

BACKGROUND OF THE INVENTION

Measurement of radon level in ambient air is becoming increasingly important. Exposures to high concentration of radon daughters have been epidemiologically correlated to an increased incidence of lung cancer in uranium miners. Recent indoor measurements indicate that radon daughter concentrations in a number of radon-contaminated dwellings are comparable to levels found in uranium mines. Radon daughter dosimeters which are precise and modestly priced are urgently needed for large-scale survey projects.

The main components of a typical radon daughter dosimeter include an aerosol sampling device and a detector. In order to determine the radon daughter level per unit volume of air, the aerosol sampling device is usually equipped with a suction pump and a filter system upon which the alpha-emitting particles are deposited. There are several versions of air samplers suitable for the radon daughters dosimeter. As an example, the aerosol sampling device of the personal dosimeter described by J. A. Auxler, et al entitled "A New Progeny Personal Dosimeter" and published in 1971 by Pergamon Press in *Health Physics*, Vol. 21, pages 126 to 128, is one of them.

A detecting system capable of distinguishing RaA and RaC' is described in the U.S. Pat. No. 3,922,555 (Chapuis and DaJlevic from Commissariat a l'Energie Atomique (CEA, Paris, France)). The system includes two collimators with filter paper at one end for retaining RaA and RaC'-laden aerosol and, at the other end, a nitrocellulose detector covered with two absorbers of different thicknesses. The optimum length for the air gap is 2.2 cm. Alphas emitted by RaA and RaC' passing through different absorbers are slowed down to the required level (3 MeV) and are detected in separate fields. Although the above patent is designed as a personal dosimeter for use in uranium mines, it can be modified to perform well in indoor as well as environmental surveys.

Experience in the field with the service of U.S. Pat. No. 3,922,555 has revealed the following problems:

(1) Uranium mine personal dosimeter—Contamination of the collimator system by long-life alphas from uranium dust—especially in the high-dust, uranium-rich mining environment, is well-known in used collimators. Recently, it was also found that a contamination problem exists for RaA even for a brand-new collimator. Latest investigation reveals that if uranium dust is allowed into the collimator, alphas from the uranium dust will have the same residual energy as alphas from RaA deposited on the filter paper. As a result, a false high measurement of RaA will be obtained. The problem can be solved either by (a) limiting the passage of uranium dust into the collimator, or (b) changing the CEA geometry so that the air gap (2.2 cm) can be shortened and the thickness of the absorber can be increased.

Moreover, decontamination of a used collimator is a serious problem. One working solution is to design a collimator system which is disposable.

(2) Indoor Survey—Usually the purpose of the indoor survey is to estimate annual mean of WL for a given indoor environment. The so-called time-average instrument is designed to measure the mean diurnal value as well as variations introduced by living habits of the occupants. In order to obtain a reliable mean value, 10 days' continuous exposure is required. Latest findings on badly radon-contaminated houses present another urgent requirement for indoor radon surveys. The purpose of this survey, usually known as "screening", is to identify houses with high radon levels for remedial action or further investigation. The survey requires instruments with minimal processing time and therefore detecting heads with higher efficiency are preferred. Detecting head design for this purpose usually cannot be used for the ordinary time-average purpose described above, as overlapping of tracks will be found. A more versatile design is needed so that detecting geometry can be changed in a simple way.

(3) Environmental survey use—A low radon level in the environment requires a high-speed battery-operated pump to compensate for the low efficiency imposed by adopting collimators. The power supply required by the high-speed pump is usually not convenient for field use. It is also expensive.

SUMMARY OF THE INVENTION

The primary object of the present invention is to provide a design for dosimeters easily adapted for use in mines, indoor and outdoor surveys. These dosimeters can also selectively detect RaA and RaC'.

In order to maintain the simplicity of the design, it is necessary in the application of the multiple collimator concept that each collimator is designed to perform the same function, said function being to limit the incident angle of alpha particles directed toward the detector. Instead of the use of two collimators for the separation of RaA from RaC' (as in the CEA device), the current design uses one single collimator. RaA and RaC' are separated by the size difference of their tracks, which can be achieved by using detector CR39. To determine the size of the individual tracks, this is the first time it has been used for size differentiation in dosimetry equipped with a pump.

The dosimeter itself is a device which is comprised of an air-sampling system and a detector. The air is sucked through a filter which retains the alpha-emitting aerosols. In the detector, the level of alpha particles which correspond to the energies of the alpha emissions of RaA and RaC' are selectively determined. Either a single or a plurality of collimators are placed between the filter and the detector. These collimators direct the alpha radiation from the aerosols collected by the filter to the detector. An absorber of uniform thickness is placed either on the exit or the inlet end of the collimators.

BRIEF DESCRIPTION OF THE DRAWINGS

FIG. 1 is a schematic design of the detecting device of the present invention.

FIG. 2a is a diagrammatic top plan view and FIG. 2b is a side diagrammatic view of a single collimator/filter system according to the present invention.

DETAILED DESCRIPTION OF THE PREFERRED EMBODIMENT

Figure 4:
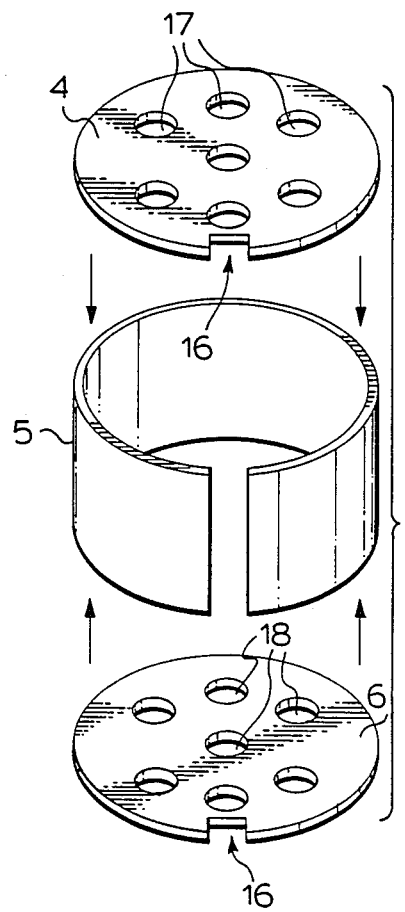
FIG. 4 is a schematic view of the collimator system of the present invention.

FIG. 1 is a schematic diagram view of a detector according to the present invention. A case 12 has internal threads at an upper end. Cap 1 is threadingly engaged to case 12. Cap 1 contacts inner cap 2. A detector 3 is disposed below inner cap 2. The detector is preferably a CR39 detector. An absorber 14 is disposed on disk 4 below detector 3. The absorber is preferably a polycarbonate material adapted to slow RaA and RaC' particles to 1 MeV and 4.3 MeV respectively. The collimator is composed of a cylindrical spacer 5 with a plastic disc on either end—one on disk 4 on top and the other on disk 6 on bottom. (See FIG. 4). Both disks are removable. It is the circular openigns 17 and 18 on the disks, along with the spacer, which act as the multiple collimators according to the present invention. Guides 16 are provided to ensure alignment of apertures 17 and 18 of disks 4 and 6. An appropriate absorber is located on the disks at either 14 or 15. The advantages of this new collimator system are:

(1) The detecting efficiency can be varied by adjusting the height of the spacer, so that the same detecting head can be used for either "screening" or ordinary time-averaging purposes.

(2) Absorbers can be fixed on either disk. If on the lower one, it will eliminate the contamination of alpha tracks from uranium dust on the alpha tracks of RaA.

(3) It significantly lowers the cost of manufacturing the collimator, and makes the collimator disposable, which is required by the mine dosimeter described above.

The multiple collimator disk system 4 and 6 preferably includes seven columns (FIG. 3a) for directing alpha particles to absorber 14 on disk 4 and to detector 3. The air to be monitored is drawn in by a pump (not shown) through openings 7. Air entering through openings 7 is drawn to filter paper 9 which is supported from below by filter paper support 10. A washer 8 rests on the periphery of the filter paper and support. Air duct 13 carries air to exit port 11.

In operation, the atmosphere to be monitored is sucked by the pump through openings 7. The aerosols are collected on filter paper 9. A fraction of the radiation produced by these latter penetrates into openings on disks 4 and 6 of the collimators. After the particles have passed the collimators, the polycarbonate absorber 14 on disk 4 slows down the alpha particles of RaA (6 MeV) to approximately 1 MeV and the particles of RaC' (7.68 MeV) to approximately 4.3 MeV, so that these particles are within the optimum detectable energy range. As a result of particle deposition on detector 3, tracks are formed.

Figure 5:
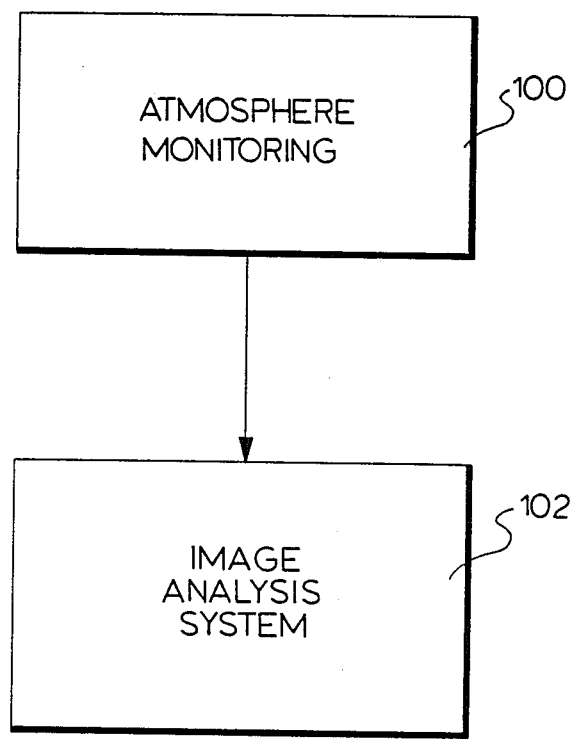
FIG. 5 is a representation of the atmosphere monitoring in combination with the image analysis system for processing the results of the sampling.

Differentiation of RaA tracks and RaC' tracks is performed based upon the non-linear relationship of the range energy and the linear track diameter/energy relationship. The first effect enhances the energy difference between two alpha groups passing through the same absorber. For example, as noted above, RaA and RaC' are slowed down to 1 MeV and 4.3 MeV respectively after passing through an air gap of 0.7 cm and a 31 $\mu$m polycarbonate absorber, and are detected as different tracks. The track diameter is inversely proportional to the alpha energy and directly proportional to the etching time in the same etching condition of etchant and temperature. Measurement of track diameter is automatically carried out by a standard computer-controlled image analysis system 102 shown in FIG. 5. Atmosphere monitoring, generally shown as 100, is carried as described above whereafter the results are processed by the image analysis system 102. The RaA and RaC' tracks are counted separately, then the total alpha energy emitted by them can be computed according to the definition of working level. With the proper use of the software-controlled image analysis system, the invention introduces the first automatic reader for the working-level dosimeter using a pump and using size differentiation method. The system will scan, differentiate, count RaA and RaC' tracks, and automatically print out the working level.

The concept of multiple collimators will now be presented with references made to FIGS. 2a, 2b, 3a and 3b. The purpose of a collimator is to limit the incident angle of alpha particles to a detector. Normal incidence is the ideal condition. The limit of the incidence angle $\theta$ is defined by the ratio of collimator width (2R) and depth (2H), $\theta = \tan^{-1} R/H$ (where R=the radius of the opening on disk 4 or 6, and H=half of the height of the collimator). At fixed $\theta$, of the single collimator system of FIGS. 2a and 2b for each value of R, there will be a corresponding value of air gap distance HT (see FIG. 2b); that is, distance between the detector and the filter, having the same geometric efficiency per unit area of detector. The HT value for the single collimator system of FIGS. 2a and 2b is 2.2 cm. To reduce HT, H must be diminished. This results in decreasing R. As mentioned before, the multiple collimator system of FIGS. 3a and 3b can be made to have the same geometric efficiency per unit detector area as that of the single collimator system of FIGS. 2a and 2b. To keep the same total geometric efficiency $E_G$, the total detector area must remain the same. Smaller R which results in a smaller detector area for each collimator of the multiple collimator system of FIGS. 3a and 3b can be compensated by using more collimators. This is the concept of advantageous employment of multiple collimators.

The overall detecting efficiency E can be expressed as a product, $E = E_G \times E_d$. $E_d$ is the efficiency varying with the density of alpha-emitters on the filter paper.

Figure 3A:
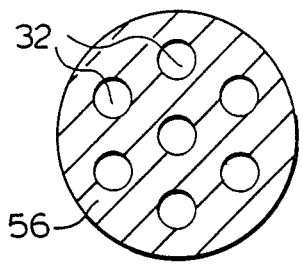
FIG. 3a is a diagrammatic top plan view of the upper disk (4) of the present invention and FIG. 3b is a side diagrammatic view of a multiple collimator/filter system for the present invention.

By introducing the multiple collimator system, it is possible to achieve the same detector area and $E_G$ as the single collimator system of FIGS. 2a and 2b, but having a smaller filter paper area resulting from a shorter air gap distance. Compare FIGS. 2a and 2b to FIGS. 3a and 3b: FIG. 2a shows a detector area 50 concentrically superimposed over a filter area 52. FIG. 3a illustrates seven detector areas 32, one for each collimator, superimposed over a filter area 56. FIG. 2a represents the single collimator system while FIG. 3a represents the multiple collimator system of the present invention. For the same limit of incidence angle and geometric efficiency, the dimensions of single and multiple collimator designs as shown in FIGS. 2a, 2b and 3a, 3b, respectively, are tabulated as:

| R(cm) | H (cm) | HT (cm) | A (area of detector in cm$^2$) | |
|---|---|---|---|---|
| single collimator | 0.65 | 2.2 | 0.28 | |
| multiple collimator 0.113 | 0.246 | 0.69 | 0.28 | (total detector corresponding to 7 collimators) |

For FIGS. 2a and 2b, the following calculations apply, wherein RS is the square root of the area of the filter:

$$RS = R(HT - H)/H$$
$$= 0.715$$

Area of detector $= \chi R^2 = 0.28$ cm$^2$

Area of filter $= \pi(RS)^2 = 1.61$ cm$^2$

Figure 3B:
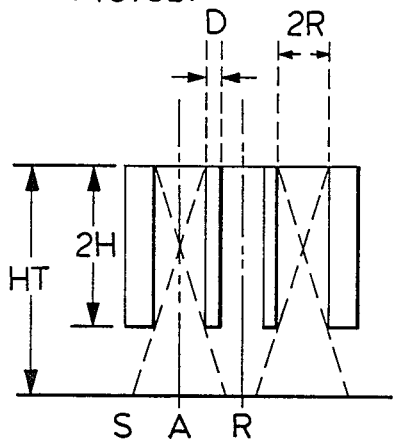

For FIGS. 3a and 3b, the following calculations apply wherein D is the distance between the consecutive collimators:

$$RS = R(HT - H)/H$$
$$= 0.48$$

Area of each detector $= \pi R^2 = 0.04$ cm$^2$

Total area of detector $= 7 \times 0.04$ cm$^2$
$$= 0.28 \text{ cm}^2$$

Area of filter $= \pi(RS)^2 = 0.729$ cm$^2$

Decrease of the filter paper area leads to increase of the density of the radon daughter deposition; hence the increase in $E_d$. With the same $E_G$ and a higher $E_d$, the overall detecting efficiency of the multi-collimator system will be higher than that of the single collimator system of FIGS. 2a and 2b.

The area of filter of the present invention is 0.72 cm$^2$, compared to that of the single collimator system of FIGS. 2a and 2b, which is 1.61 cm$^2$. As a consequence, the $E_d$ increases resulting in an overall detecting efficiency increase of 224%. This will reduce the pump flow rate requirement from 60 to 27 l/hr.

The reduction of the air gap not only makes the detecting system more compact and less expensive in casting, but also presents another method for preventing the problem of the uranium dust contaminating RaA tracks as mentioned above. It should be emphasized here that alphas from RaA deposited on the filter emit the same energy as uranium dust after passing through 2.2 cm of air gap. Therefore, alphas from the uranium dust which plate-out in the vicinity of absorber 14 will be indistinguishable from RaA. Alpha energy of RaA after passing through a shorter air gap (shorter than 2.2 cm, for instance, 0.7 cm in FIG. 1) can be chosen in this invention so that alphas from the uranium dust cannot be registered by the detector.

While a detailed description of the preferred embodiment has been given above, it is to be understood that the scope of the present invention is not to be limited thereby, but is to be determined by the claims which follow.

What is claimed is:

1. An active radon daughter dosimeter which simultaneously processes radiation in a manner to effect low cost differentiation of RaA and RaC' by means of track evaluation, said dosimeter comprising a filter for separating aerosols contained in air samples, a detecting surface spaced from said filter and positioned generally parallel to said filter for receiving radiation emitted from aerosols on said filter, and an absorber intermediate said filter and said detecting surface which decreases the kinetic energy of RaA and RaC' radiation in a manner to increase the difference in energy levels therebetween, said absorber and said detecting surface being selected to cooperate in a manner to allow improved differentiation of the resulting tracks of RaA and RaC' recorded on the detector after passing through said absorber relative to differentiation of the tracks without processing through the absorber.

2. An active radon daughter dosimeter as claimed in claim 1, including at least one collimator and a single uniform absorber.

3. An active radon daughter dosimeter as claimed in claim 2, wherein said absorber is selected to achieve the increase in the difference between the resulting kinetic energy of RaA and RaC' due to the non-linearity of the range-energy relationship when RaA and RaC' are passed through the same absorber.

4. An active dosimeter as claimed in claim 3, wherein said dosimeter is of reduced height due to the use of a number of small collimators each of which contributes to the net sampling area, said collimators being of reduced diameter whereby the length thereof is reduced relative to a single collimator to achieve the same degree of non-axial radiation.

5. An active dosimeter as claimed in claim 2, 3 or 4, wherein said detector surface is polycarbonate CR 39.

6. An active dosimeter as claimed in claim 2, 3 or 4, wherein said absorber decreases the kinetic energy of RaA radiation to about 1 MeV and the kinetic energy of RaC' radiation is reduced to about 4 MeV.

7. In an active radon daughter dosimeter, a method of improving track differentiation of RaA and RaC' by non-linearly reducing the energy level of radiation in a manner to increase the difference in energy level between RaA and RaC' and subsequently record the radiation on a detector capable of improved track differentiation of RaA and RaC' due to the increase in the difference in energy level therebetween.

8. In an active radon daughter dosimeter as claimed in claim 7, wherein the differentiation of RaA and RaC' is subsequently determined by means of an image analysis system.

9. In an active radon daughter dosimeter as claimed in claim 7 or 8, wherein said detector is CR 39 polycarbonate.

10. A method for improving the resolution of tracks of RaA and RaC' radiation recorded on a detector and emitted from a filter generally opposite said detector, said method comprising collecting from air aerosols and depositing the same on a filter, positioning a detector surface opposite said filter capable of recording the track of RaA and RaC' impinged thereon, placing an absorber intermediate said filter and said detecting surface chosen to differentially decrease the kinetic energy of RaA and RaC' to increase the energy difference therebetween, said decreased energy levels being more easily distinguished on said detector surface than RaA and RaC' radiation which has not had the kinetic energy thereof decreased.

11. A method as claimed in claim 10, wherein said detector is CR 39 polycarbonate.

12. A method as claimed in claim 10 or 11, wherein said absorber is a plastic film.

13. A method as claimed in claim 10, wherein said differentiation between RaA and RaC' is determined by means of an image analysis system.

14. A method as claimed in claim 13, wherein the kinetic energy of RaA radiation is reduced to about 1 MeV and the kinetic energy of RaC' radiation is reduced to about 4 MeV.

15. A low profile active dosimeter comprising a filter for aerosols removed from air samples, a detecting surface spaced from said filter and positioned to receive radiation emitted from such aerosols, an absorber intermediate said filter and said detecting surface which decreases the kinetic energy of RaA and RaC', said dosimeter including at least two collimators all of which process RaA and RaC' and collectively define a net detecting area, said collimators being of a particular length to eliminate oblique radiation, said collimators being of a length substantially less than the length of a single collimator sized to achieve the same net detecting area.

16. A low profile active dosimeter as claimed in claim 15, having at least seven collimators.

17. A low profile dosimeter as claimed in claim 16, wherein said absorber closes the end of collimators nearest said filter and reduces the probability of aerosols contaminating said collimators.

18. A low profile dosimeter as claimed in claim 15, wherein said collimators are defined by two aligned disks held in spaced relationship by a spacer.

19. A low profile dosimeter as claimed in claim 18, wherein the number and height of said collimators are varied by substituting different disks and spacers to adapt the dosimeter for different applications.

20. In an active dosimeter which simultaneously processes radon radiation in a manner to effect differentiation of RaA and RaC' by means of track evaluation, the improvement comprising at least two collimators of reduced diameter and height to reduce the overall height of said dosimeter while still providing an acceptable degree of processing to reduce oblique radiation, the number of collimators being selected according to a desired net area through which radiation is to pass such that an increase in net area through which radiation passes is varied by increasing the number of collimators while the height of the dosimeter can remain constant.

* * * * *